(12) United States Patent
Bender et al.

(10) Patent No.: US 7,270,227 B2
(45) Date of Patent: Sep. 18, 2007

(54) MATERIAL HANDLING SYSTEM AND METHOD OF USE

(75) Inventors: Tonya K. Bender, Owego, NY (US); Ronald L. Binning, Orlando, FL (US); Eugene Stradley, Owego, NY (US); Shawn Younkin, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 162 days.

(21) Appl. No.: 10/971,021

(22) Filed: Oct. 25, 2004

(65) Prior Publication Data

US 2007/0029165 A1 Feb. 8, 2007

Related U.S. Application Data

(60) Provisional application No. 60/514,902, filed on Oct. 29, 2003.

(51) Int. Cl.
*B65G 37/00* (2006.01)

(52) U.S. Cl. .................. 198/358; 198/448; 198/436

(58) Field of Classification Search ............. 198/436, 198/437, 443, 444, 445, 446, 447, 448, 358, 198/350
See application file for complete search history.

(56) References Cited

U.S. PATENT DOCUMENTS

| | | | |
|---|---|---|---|
| 3,666,073 A * | 5/1972 | Lings et al. | 198/448 |
| 3,678,278 A | 7/1972 | Peil | |
| 3,695,462 A * | 10/1972 | Sullivan | 198/350 |
| 3,735,853 A * | 5/1973 | Lingg et al. | 198/448 |
| 3,776,395 A * | 12/1973 | Lingg et al. | 198/580 |
| 4,137,567 A | 1/1979 | Grube | |
| 4,210,811 A | 7/1980 | Dennhoven et al. | |
| 4,239,434 A * | 12/1980 | Gannon | 198/349.8 |
| 4,416,435 A | 11/1983 | Szendrödi et al. | |
| 4,604,704 A | 8/1986 | Eaves et al. | |
| 4,634,849 A | 1/1987 | Klingen | |
| 4,879,735 A | 11/1989 | Owens | |
| 5,153,439 A | 10/1992 | Gozani et al. | |
| 5,182,764 A | 1/1993 | Peschmann et al. | |
| 5,363,951 A | 11/1994 | Mensch | |

(Continued)

FOREIGN PATENT DOCUMENTS

CA 2443469 10/2002

(Continued)

OTHER PUBLICATIONS

HI-SCAN 6040i/7555i "X-ray Inspection Systems".

(Continued)

*Primary Examiner*—James R. Bidwell
(74) *Attorney, Agent, or Firm*—Miles & Stockbridge PC; James T. Carmichael

(57) ABSTRACT

A material handling system and method of use for increasing throughput at security checkpoints. The material handling system includes a dual input conveyor with a merge conveyor leading to a detection system. At the output of the detection system is a diverting mechanism which will divert the items leaving the detection system to one of two output conveyors, corresponding to the input conveyors. A reject mechanism and accompanying conveyor may be provided, in addition to a bin return and control system.

24 Claims, 4 Drawing Sheets

U.S. PATENT DOCUMENTS

| | | |
|---|---|---|
| 5,367,552 A | 11/1994 | Perschmann |
| 5,373,538 A | 12/1994 | Grenier et al. |
| 5,479,023 A | 12/1995 | Bartle |
| 5,490,218 A | 2/1996 | Krug et al. |
| 5,600,303 A | 2/1997 | Husseiny et al. |
| 5,600,700 A | 2/1997 | Krug et al. |
| 5,642,393 A | 6/1997 | Krug et al. |
| 5,692,029 A | 11/1997 | Husseiny et al. |
| 5,793,639 A | 8/1998 | Yamazaki |
| 5,796,802 A | 8/1998 | Gordon |
| 5,802,289 A | 9/1998 | Oprescu |
| 5,838,758 A | 11/1998 | Krug et al. |
| 5,870,449 A | 2/1999 | Lee et al. |
| 5,910,973 A | 6/1999 | Grodzins |
| 5,949,842 A | 9/1999 | Schafer et al. |
| 5,970,113 A | 10/1999 | Crawford et al. |
| 5,974,111 A | 10/1999 | Krug et al. |
| 5,991,764 A | 11/1999 | Sundaresan |
| 6,014,628 A | 1/2000 | Kovarik, Jr. |
| 6,018,562 A | 1/2000 | Willson |
| 6,044,353 A | 3/2000 | Pugliese, III |
| 6,088,423 A | 7/2000 | Krug et al. |
| 6,145,653 A | 11/2000 | Mensch |
| 6,158,658 A | 12/2000 | Barclay |
| 6,218,943 B1 | 4/2001 | Ellenbogen |
| 6,222,452 B1 | 4/2001 | Ahlstrom et al. |
| 6,230,043 B1 | 5/2001 | Johnson |
| 6,256,404 B1 | 7/2001 | Gordon et al. |
| 6,283,260 B1 | 9/2001 | Yasuda, Sr. |
| 6,335,688 B1 | 1/2002 | Sweatte |
| 6,335,960 B2 | 1/2002 | Knigge et al. |
| 6,345,113 B1 | 2/2002 | Crawford et al. |
| 6,359,886 B1 | 3/2002 | Ujihara et al. |
| 6,364,365 B1 | 4/2002 | Caplan |
| 6,370,222 B1 | 4/2002 | Cornick, Jr. |
| 6,460,681 B1 | 10/2002 | Coutant et al. |
| 6,471,039 B1 | 10/2002 | Bruun et al. |
| 6,472,984 B1 | 10/2002 | Risi |
| 6,507,278 B1 | 1/2003 | Brunetti et al. |
| 6,512,964 B1 | 1/2003 | Quackenbush et al. |
| 6,546,072 B1 | 4/2003 | Chalmers |
| 6,580,778 B2 | 6/2003 | Meder |
| 6,594,547 B2 | 7/2003 | Manabe et al. |
| 6,637,563 B1 | 10/2003 | Ruckh |
| 6,650,729 B2 | 11/2003 | Braess et al. |
| 6,668,990 B2 | 12/2003 | Humiston, Jr. |
| 6,707,879 B2 | 3/2004 | McClelland et al. |
| 6,721,391 B2 | 4/2004 | McClelland et al. |
| 6,789,660 B1 * | 9/2004 | Bruun et al. ............. 198/347.1 |
| 6,791,487 B1 | 9/2004 | Singh et al. |
| 6,922,460 B2 | 7/2005 | Skatter et al. |
| 6,946,300 B2 | 9/2005 | Nguyen et al. |
| 6,952,163 B2 | 10/2005 | Huey et al. |
| 6,970,088 B2 | 11/2005 | Kovach |
| 6,982,960 B2 | 1/2006 | Lee et al. |
| 7,027,773 B1 | 4/2006 | McMillin |
| 2001/0015380 A1 | 8/2001 | Good et al. |
| 2002/0040928 A1 | 4/2002 | Jalili et al. |
| 2002/0069293 A1 | 6/2002 | Natalio |
| 2002/0107714 A1 | 8/2002 | Whitlock et al. |
| 2002/0134836 A1 | 9/2002 | Cash et al. |
| 2002/0172324 A1 | 11/2002 | Ellengogen |
| 2002/0176532 A1 | 11/2002 | McClelland et al. |
| 2002/0185358 A1 | 12/2002 | Zeitler et al. |
| 2002/0186862 A1 | 12/2002 | McClelland et al. |
| 2002/0191739 A1 | 12/2002 | Allen et al. |
| 2002/0198731 A1 | 12/2002 | Barnes et al. |
| 2003/0023592 A1 | 1/2003 | Modica et al. |
| 2003/0085163 A1 | 5/2003 | Chan et al. |
| 2003/0085281 A1 | 5/2003 | Knowles et al. |
| 2003/0100973 A1 | 5/2003 | Quackenbush et al. |
| 2003/0115340 A1 | 6/2003 | Sagula et al. |
| 2003/0118151 A1 | 6/2003 | Menhardt |
| 2003/0127511 A1 | 7/2003 | Kelly et al. |
| 2003/0128100 A1 | 7/2003 | Burkhardt et al. |
| 2003/0128806 A1 | 7/2003 | Morrell |
| 2003/0137415 A1 | 7/2003 | Thomson |
| 2003/0141411 A1 | 7/2003 | Pandya et al. |
| 2003/0147484 A1 | 8/2003 | Olshansky et al. |
| 2003/0152186 A1 | 8/2003 | Jurczyk et al. |
| 2003/0156679 A1 | 8/2003 | Mori et al. |
| 2003/0185340 A1 | 10/2003 | Frantz |
| 2003/0189094 A1 | 10/2003 | Trabitz |
| 2003/0214583 A1 | 11/2003 | Sadok |
| 2004/0001568 A1 | 1/2004 | Impson et al. |
| 2004/0010697 A1 | 1/2004 | White |
| 2004/0017887 A1 | 1/2004 | Le et al. |
| 2004/0021572 A1 | 2/2004 | Schoen et al. |
| 2004/0036623 A1 | 2/2004 | Chung |
| 2004/0054550 A1 | 3/2004 | Cole et al. |
| 2004/0148571 A1 | 7/2004 | Lue |
| 2005/0028091 A1 | 2/2005 | Bordawekar et al. |
| 2005/0031076 A1 | 2/2005 | McClelland et al. |
| 2005/0036470 A1 | 2/2005 | Calvert |
| 2005/0110672 A1 | 5/2005 | Cardiasmenos et al. |
| 2005/0190061 A1 | 9/2005 | Trela |
| 2005/0206514 A1 | 9/2005 | Zanovitch et al. |
| 2005/0237180 A9 | 10/2005 | Boesch et al. |
| 2005/0248450 A1 | 11/2005 | Zanovitch |
| 2005/0251397 A1 | 11/2005 | Zanovitch et al. |
| 2005/0251398 A1 | 11/2005 | Zanovitch et al. |

FOREIGN PATENT DOCUMENTS

| | | |
|---|---|---|
| CN | 1428718 | 7/2003 |
| DE | 4210516 | 10/1993 |
| EP | 0 459 648 A1 | 12/1991 |
| JP | 6075978 | 3/1994 |
| JP | 2002 292372 A | 10/2000 |
| JP | 2003 122879 A | 4/2003 |
| WO | WO90/12660 | 11/1990 |
| WO | WO 02/082290 A2 | 10/2002 |
| WO | WO 03/029844 A2 | 4/2003 |

OTHER PUBLICATIONS

Information Technology for Counterterrorism, Box 3.7, "Scenarios for Automated Evidence Combination" 4 pages.

Tony Lee Orrd, "Is That A Gun Or Just A Security Test?" Government Computer News/GCN.com, Jun. 5, 2000, vol. 19, No. 14, pp. 1-3.

Affidavit of Joseph P. Zanovitch.

Robert J. Edley, "Hold Baggage Screening Systems" Airport International, pp. 1-6.

L-3 Comunication Security & Detection Systems, L-3 Communications Secures Poland's First HBS Systems Award—Total Contract Valued at Approx. $1 Million, Airport International, pp. 1-2.

Bill Mawer, "Security Net—The Shape of Things to Come" Airport International, pp. 1-7.

Rapiscan, "Rapiscan Advanced Technologies" pp. 1-2.

Rapiscan 515, "X-Ray Screening System", pp.1-2.

Rapiscan 519, "Advanced Portable X-Ray System", pp. 1-2.

Rapiscan 520B, "X-Ray Screening System", pp. 1-2.

Rapiscan 522B, pp. 1-2.

Rapiscan 524, "X-Ray Screening System", pp. 1-2.

Rapiscan 526, "X-Ray Screening System", pp. 1-2.

Rapiscan 527, "X-Ray Screening System", pp. 1-2.

Rapiscan 532H, pp. 1-2.

* cited by examiner

MATERIAL HANDLING SYSTEM AND METHOD OF USE

CROSS REFERENCE TO RELATED APPLICATION

This application claims priority to provisional application Ser. No. 60/514,902, filed on Oct. 29, 2003, and which is incorporated in its entirety herein by reference.

FIELD OF THE INVENTION

The invention generally relates to a material handling system and method of use and, more particularly, to a system and method for increasing throughput at security checkpoints.

BACKGROUND DESCRIPTION

Airport security is a critical aspect of air safety throughout the world. In current situations, within the United States and many other countries worldwide, airport security checkpoints have been fast evolving to meet the safety and other concerns of the public, in general. For example, the public demands safe air travel, but also places a premium on their own convenience when traveling within airports. This includes conveniently located safety checkpoints, shorter lines at such safety checkpoints and ease of effort for placing their items such as baggage through x-ray machines and the like.

To address many of these issues, industry and the Transportation Safety Administration (TSA) have been developing new systems in an attempt to increase throughput of the passengers through security checkpoints. However, in many instances, these new systems are very expensive to implement and, in some instances, may even contribute to the problem that they are attempting to solve. By way of one example, the TSA has hired more airport screeners, security personnel and others in an attempt to increase efficiency. Although the addition of more personnel may, in the short term, alleviate some of the inconveniences of passengers, they are very expensive to implement by way of added labor costs and overhead.

Another solution is simply to increase the number of safety checkpoints. This certainly can increase throughput, but this solution also has its shortcomings. First, in order to increase the number of safety checkpoints, more scanning machines are needed. Also, since airports are under extreme space constraints, especially in view of the increased traffic throughout airports in addition to the physical constraints of the buildings themselves, this solution leads to increased congestion and loss of space for airport vendor and support services. This causes loss of revenue to the airport authorities.

By way of example, FIG. 1 shows a conventional layout of a security checkpoint. The conventional layout is depicted generally as reference numeral 100 and includes two substantially identical lanes of security checkpoints 100a and 100b. In this conventional layout, a passenger will first place their baggage and other items at the table 102, which leads to a conventional conveyor 104. However, this area typically has insufficient "buffer" space for passenger divestiture causing congestion, longer queues and the like.

The conveyor 104 then transports the baggage and other items to the x-ray machine 106, at which point a security screener will use a monitor 106a to view the internal contents of the items passing through. At the output of the machine 106, another conventional conveyor 108 is used to transport the baggage to a pick up area 110. Much like the divesture area 102, the pick up area, due to space constraints within the airport, has insufficient buffer space, again, causing congestion, longer queues and the like.

If there was anything suspicious within the baggage, an inspection area 112 is used to manually search through such items near the output area of the system. This inspection area is accessible to the public, which may cause some security concerns. Also, this manual operation, since it is "in-line" with the non-rejected items, may result in congestion at each station, reduce throughput, and increase passenger queue times.

Additionally, a chemical trace detection system 114 may be provided at the output of the system. But, since the chemical trace detection system 114 is very expensive, only one of these systems is used for each pair of checkpoints 102a, 102b. Thus, in case items such as laptops that have been transported through the checkpoint 102b, must be screened, an airport personnel must bring the item to the chemical trace detection system 114 at checkpoint 102a. This leads to more congestion, more time, and more labor needed at each of the checkpoints.

While the baggage is being transported and searched through the system, the passenger is ushered through a metal detector 116. If a suspicious object is detected, the passenger will be manually searched in "hand wand" area 118. Also, due to the limited space associated with each of these systems, only one passenger at a time may place their baggage and other items on the table 102. Thus in this conventional system, the existing checkpoint design has:
- limited material handling;
- extensive manual operations (rejects, review of suspicious items, rescanning items, etc.);
- movement of personnel that is counter to the normal flow, causing congestion and confusion; and
- inadequate buffers that cause stoppage of processing operations.

Thus, this layout has increased passenger queue times resulting in customer dissatisfaction. Long or unpredictable queue times and customer dissatisfaction can lead to decreased travel which causes a negative economic condition at airports. Also, these shortcomings have resulted in the TSA to purchase, install, staff, and maintain additional equipment, adding to overall costs.

The invention is directed to overcoming one or more of the problems as set forth above.

SUMMARY OF THE INVENTION

In a first aspect of the invention, a material handling system includes a plurality of input and output conveyors and a merge device to singulate the flow of the items from the plurality of input conveyors into a single transportation path. The system further includes an output diverting device positioned between an output of the single transportation path and the plurality of output conveyors to separate and direct the items to a respective one of the plurality of output conveyors.

In another aspect of the invention, the material handling device includes a plurality of input conveyors for conveying items and a singulator positioned in the transportation path of the items exiting from each of the plurality of input conveyors. The singulator directs the items into a single conveyor system leading to a detection system. A plurality of buffer conveyors provides buffer space for the items exiting from the detection system. A diverting device positioned at an output of the single conveyor system directs the items to one of the plurality of buffer conveyors.

In yet another aspect of the invention, the material handling device includes at least two input conveyors for conveying items and at least two pick-up conveyors. A metering device is movably positioned between respective outputs of the at least two input conveyors, and directs the items into a single conveyor system leading to a detection system. A diverting device is movably positioned between respective inputs of the at least two pick-up conveyors to direct the items exiting from the detection system to one of the at least two pick-up conveyors. A control coordinates movement of the metering device and the diverting device to regulate the transportation path of the items between the at least two input conveyors and the at least two pick-up conveyors.

DETAILED DESCRIPTION OF EMBODIMENTS OF THE INVENTION

The invention is directed to an integrated material handling system in one or more configurations, based on specific space constraints for each airport. This material handling system is designed to integrate, in one example, at least two walk through metal detectors with one x-ray scanning device or EWDS (Explosive and Weapons Detection System) (generally referred to as a "detection system") to form an automated processing "cell". The system and method of the invention may equally apply to only x-ray scanning devices, walk through metal detectors or any combination of the above with or without the EWDS. Depending on the specific uses, the system and method may also be implemented with optical character recognitions (OCR) or biometrics, in some implementations. The system and method of the invention may also be used in other applications such as postal application, warehouse applications and the like, and thus should not be limited to the environments discussed herein.

In one implementation, the system and method of the invention will reduce staffing at each checkpoint resulting in decreased operating costs. Additionally, the system and method will provide adequate automation to eliminate work around operations and eliminate or reduce counter flow movement of personnel. The material handling system also provides adequate buffer space to assure continuous processing operations which reduces passenger or item queue times resulting in improved customer satisfaction.

In one such integrated system, two input buffers at the front of the cell provide additional space for passengers or customers or other operators to remove metallic objects, bulky jackets, and the like, as well as places laptops or other types of items into separate bins or trays. The buffers provide a more even flow of passengers and items through the checkpoint. Additionally, the system and method of the invention, may include integrated controls to:

assure that checkpoint staff can control the flow of passengers;

maintain control of any passengers requiring additional screening;

assure that certain passengers' items are automatically rejected for additional required inspection; and track any type of items through the system.

The system design also includes dual output conveyors to provide additional buffer space for passengers or operators to collect the divested items and re-assemble themselves, for example. The system additionally incorporates a reject conveyor on the output side of the detection system that separates items requiring additional security screening. These items may be shielded from the general public access. A separate conveyor may be provided to transport empty bins from the output side of the system back to the input side for re-use by passengers.

Integrated System of the Invention

Figure 1:
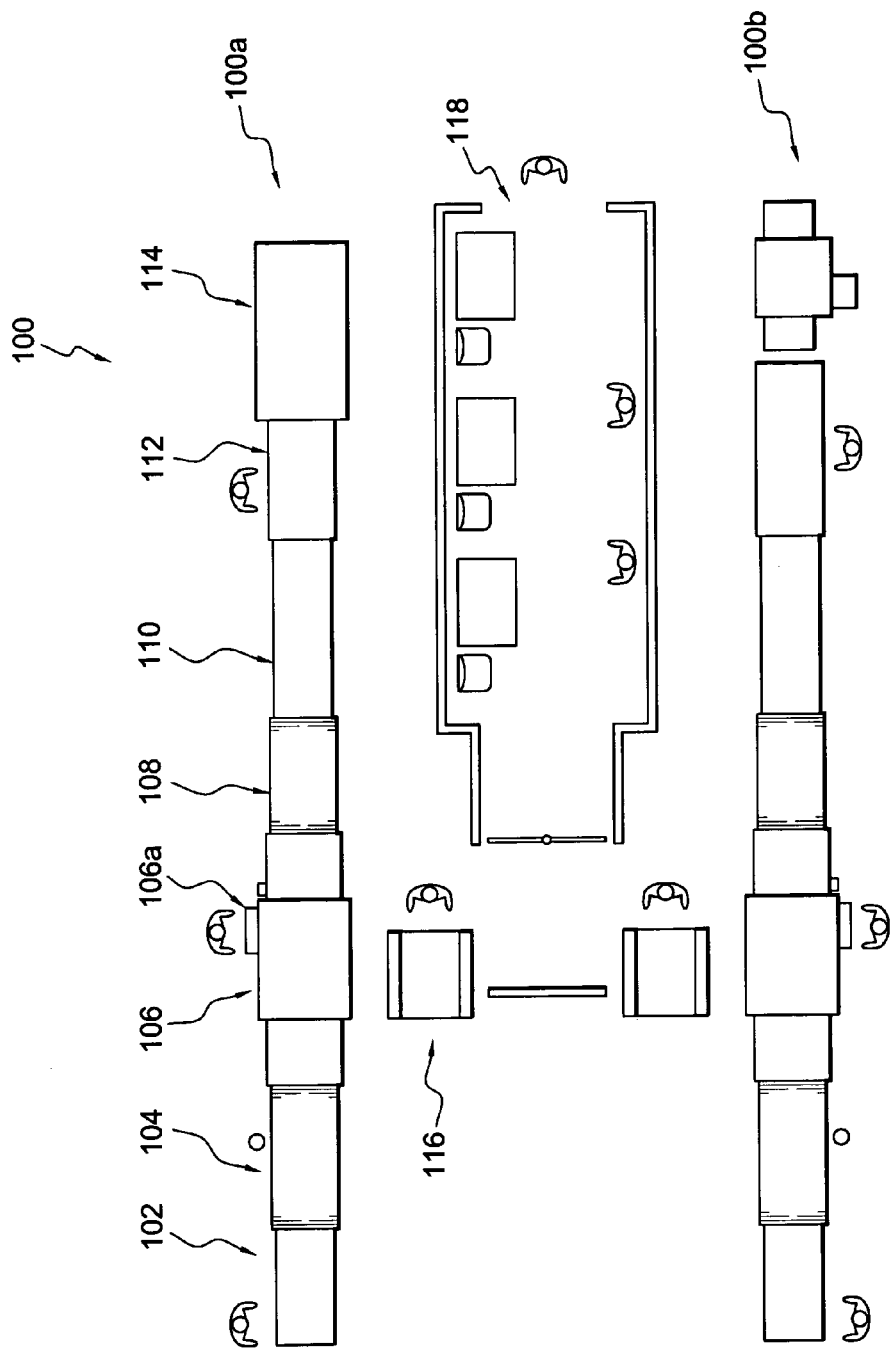
FIG. 1 shows a conventional material handling layout at a security checkpoint.
Figure 2:
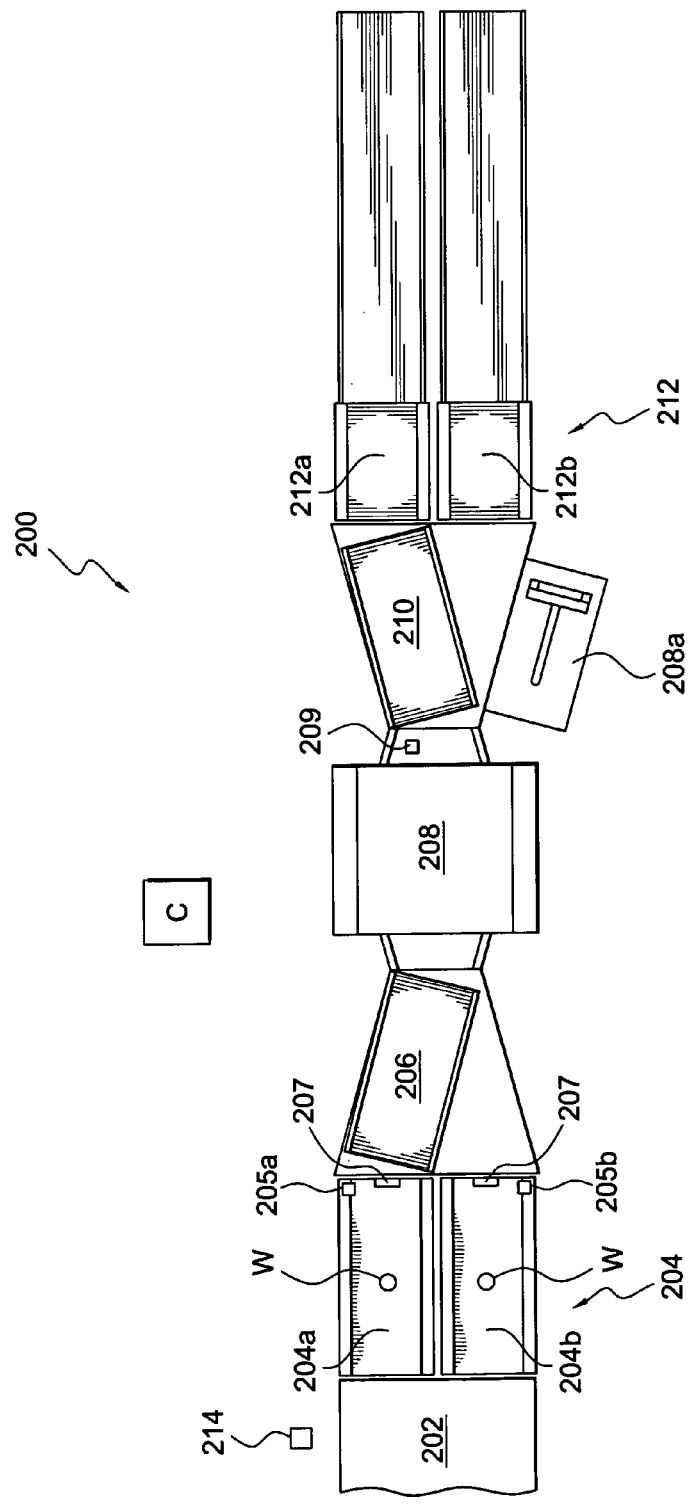
FIG. 2 shows a plan view of a material handing system in accordance with the invention.

FIG. 2 shows a plan view of a material handing system in accordance with the invention. The material handling system is generally depicted as reference numeral 200 and includes an input buffer space 202 in communication with a dual feeder conveyer 204. The dual feed conveyor 204 comprises a first conveyor 204a and a second conveyor 204b. It should be understood by those of skill in the art that the dual feed conveyor 204 may integrate more than two conveyors. The conveyors 204a, 204b are, in one embodiment, belt conveyors, but may be any known conveyor such as roller conveyors and the like. At the output side of the conveyors 204a, 204b is a merge or metering device 206. The merge device 206 is capable of merging the flow of items from both the conveyors 204a, 204b and metering such items to a single detection system 208.

In one implementation, the merge device 206 may be a pivoting or swivel conveyor. The pivot may be activated either manually or controlled by control "C", as discussed in more detail below. The pivot may, in one implementation, be a pin mechanism, but may be any other known pivoting device capable of moving between the outputs of the conveyors 204a, 204b. The merge device 206 may be moved via a linear actuator, rack and pinion gear, other gear system, belt driven, or the like between the outputs of the conveyors 204a, 204b in order to transport items placed on either of the conveyors 204a, 204b to the detection system 208.

In another implementation, the merge device 206 may be a "Y" merge, in which case the merge device 206 may be stationary with inputs aligned with each of the outputs of the conveyors 204a, 204b. In another implementation, a divert or sweep arm may be implemented. In this implementation, the divert arm may be controlled by control "C" to move between the outputs of each of the conveyors 204a, 204b. In this example, the divert arm may allow only items on one conveyor to be transported to the detection system, while blocking items on the other conveyor. In yet another implementation, a belt guide may be implemented. In any of these illustrations, the merge device 206 allows items on either of the conveyors 204a, 204b to be transported to the detection system 208. It should be understood that the merge device shown, for example, in FIG. 2 may equally represent any of the merge devices described herein.

In yet another aspect, a sensor such as a photodiode or detector may be positioned near or on each of the conveyors 204a, 204b, in addition to a reading device such as an OCR or other scanning device 207. For example, a detector 205a may be mounted on or near the conveyor 204a and a detector 205b may be mounted on or near the conveyor 204b. The detectors 205a, 205b may be used to regulate the control of the items on each of the respective conveyors, as well as regulate the movement of the merge device 206. As should be understood, the detectors 205a, 205b may equally represent a scanning device, photodiode, shaft encoder or other sensor capable of detecting the item and/or specific information concerning the product, e.g., color, shape or the like.

By way of example, as an item is detected on conveyor 204a by detector 205a (via a photodiode, for example), the merge device may automatically move to the output of such conveyor 204a in order to transport the items from the conveyor to the detection system. Similarly, as an item is detected on conveyor 204b by detector 205b (via a photodiode, for example), the merge device 206 may automatically move to the output of such conveyor 204b in order to transport the items from the conveyor to the detection system. Also, the detectors may initiate movement of the conveyors and stop movement of the conveyors via the control "C".

The detectors 205a, 205b may also be used for identification of the items through the system by, for example, providing a measurement of the items prior to entering into the detection system. This may be accomplished using encoders, for example, weight sensors and the like, or simply calculating the dimensions of the items as they pass by the photodiode. Then, at the output, the items may be measured again by another respective photodiode 209 or other type of known detector, in a conventional manner, to control the movement of an output diverting device 210, between output conveyors generally shown as reference numeral 212 and more specifically output conveyors 212a, 212b. In this manner, the items which originated from either conveyor 204a or 204b will be transported to the respective conveyor 212a or 212b. In other words, the diverting device 210 will ensure that screened and cleared items will be directed to the respective output conveyor corresponding to a same side as the respective input conveyor.

The OCR 207 may also capture information concerning the items such as identification information, e.g., shape, color or the like, in order to ensure that the items are matched at the output of the detection system 208, as well as to the passenger. This may equally be performed by other scanning devices such as a bar code scanner or the like. Additionally, using the OCR, for example, a specific identification may be given to the item and provided to the control "C". The control "C", as discussed in more detail below, may then use this information to control the movements of the diverting device 210 (and the merge device 206).

In one implementation, the diverting device 210 may be a pivoting or swivel conveyor. The pivot may be activated either manually or controlled by control "C". The pivot may, in one implementation, be a pin mechanism, but may be any other known pivoting device capable of moving between the inputs of the conveyors 212a, 212b. The diverting device 210 may be moved via a linear actuator, rack and pinion gear, other gear system, belt driven, or the like between the output of the detection system and respective conveyors 212a, 212b in order to transport items onto the conveyors 212a, 212b.

In another implementation, the diverting device 210 may include a divert or sweep arm. In this implementation, the divert arm may be controlled by control "C" to move between the input of each of the conveyors 212a, 212b. In this example, the divert arm may allow only items being output from the detection system to be transported to the proper conveyor 212a, 212b. In yet another implementation, a belt guide may be implemented. In any of these illustrations, the diverting device 210 allows items from either of the conveyors 204a, 204b to be properly transported to the respective conveyors 212a, 212b. It should be understood that the diverting device shown, for example, in FIG. 2 may equally represent any of the diverting devices described herein.

As discussed below, the diverting device may additionally have a hydraulic/pneumatic lift, linear actuator or other known mechanism to lift the diverting device to another height. This will allow rejected items to be placed on a separate conveyor for further manual inspection while ensuring that non-rejected items are efficiently transported to the respective conveyors 212a, 212b. In one implementation, this separate conveyor may be a third conveyor at the same level as the conveyors 212a, 212b, but separated from the public so that throughput is not impaired. This reject mechanism will improve item throughput while alleviating passenger queues.

The material handling system 200 may also include a biometrics device such as an iris scanner, palm reader or magnetic card reader, generally depicted as reference numeral 214 provided at the buffer space 202. The reader 214 may be used for preferred or prescreened passengers. In this illustration, the system will be notified that a preferred passenger is entering the system and that only a random spot check of the items are required. This, in implementation, increases the throughput of the system by only having to scan a limited number of items for the preferred passengers. The sensitivity of the scanning equipment may also be adjusted for preferred passengers, with tighter tolerances held for others.

Figure 3:
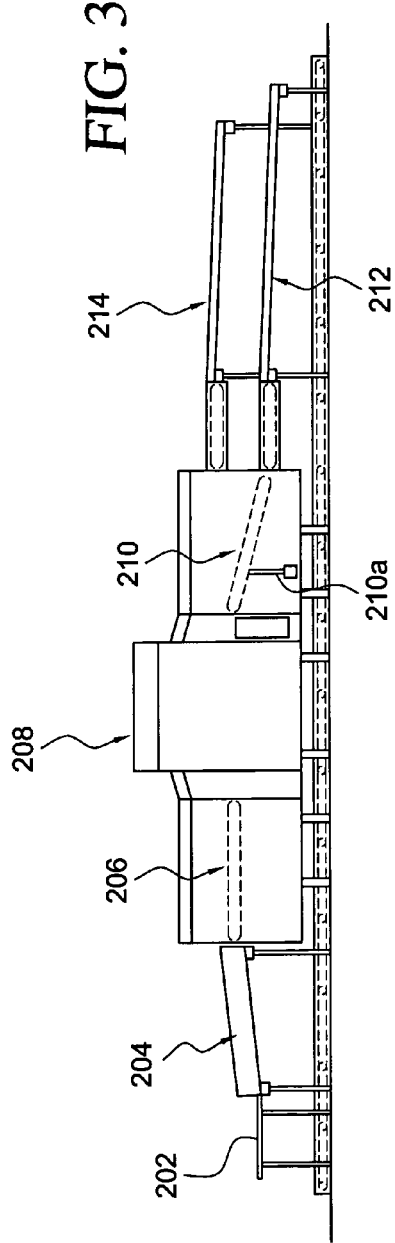
FIG. 3 shows an elevated plan view of the material handling system in accordance with the invention.

FIG. 3 shows an elevated plan view of the material handling system in accordance with the invention. For brevity, the side view shows the single buffer area 202, the dual conveyors 204, the merge device 206, the detection system 208, the diverting device 210 and the conveyors 212. (FIG. 2 further shows the reject conveyor 214 in more detail.) In this implementation, the reject conveyor 214 is elevated above the conveyors 212. The reject conveyor 214 is preferably a single conveyor which does not interrupt the throughput of the system. That is, the reject conveyor 214 is not in the same flow of output as the non-rejected searched items, but instead is diverted therefrom.

To divert the reject items, which may be performed manually or by control "C", the diverting device 212 may include hydraulic/pneumatic lift, linear actuator or other known mechanism 210a to lift the diverting device to the height of the reject conveyor 214. This will allow rejected items to be placed on the separate conveyor for further manual inspection while ensuring that non-rejected items are efficiently transported to the respective conveyors 212a, 212b. In one implementation, this separate conveyor may be a third conveyor at the same level as the conveyors 212, and the diverting device may be configured to accommodate the travel needed to reach this third conveyor. Or, in another implementation, a divert arm may be programmed to divert items between the conveyors 212, in addition to the reject conveyor 214. In the implementation of three conveyors, the diverting mechanism is thus a tri-directional diverting mechanism; however, in other implementation more than three conveyors may be used and the diverting mechanism will accommodate each of these conveyors in accordance with the above discussion.

Figure 4:
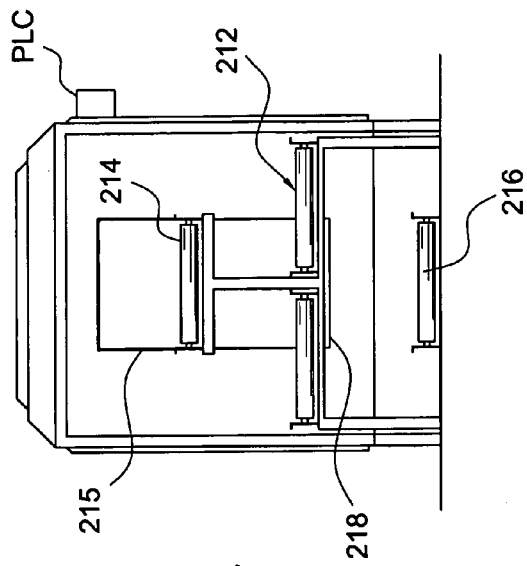
FIG. 4 shows an end view of the material handling system in accordance with the invention.

FIG. 4 shows an end view of the material handling system in accordance with the invention. In this view, a bin return 216 is provided at the output of the system. The bin return 216 may be provided below or beside or other convenient location with respect to the conveyors 212 and may extend the entire length of the system in order to return bins or trays to the input buffer space 202. The bin return 216 may be a low pressure or zero pressure conveyor, as an example. The bins or trays may be automatically placed onto the bin return 216 by a vertical lift unit 218, which may utilize a hydraulic/pneumatic lift, linear actuator or a chute, in addition to a reciprocating lift which is known in the art. This process may also be performed manually by passengers or TSA personnel.

As further seen, a guard 215, e.g., clear cover, may be used about or at one or both sides of the reject conveyor 214. This allows the rejected items to be seen but not accessed by the public. A PLC control panel may be installed at the end of this conveyor so that only authorized personnel can remove the items. In one implementation, the PLC control includes a small touch screen GUI monitor integrated with the PLC. Authorized personnel will use this monitor to determine the status of the next item in the queue and to advance the item forward onto the conveyors 212.

Figure 5:
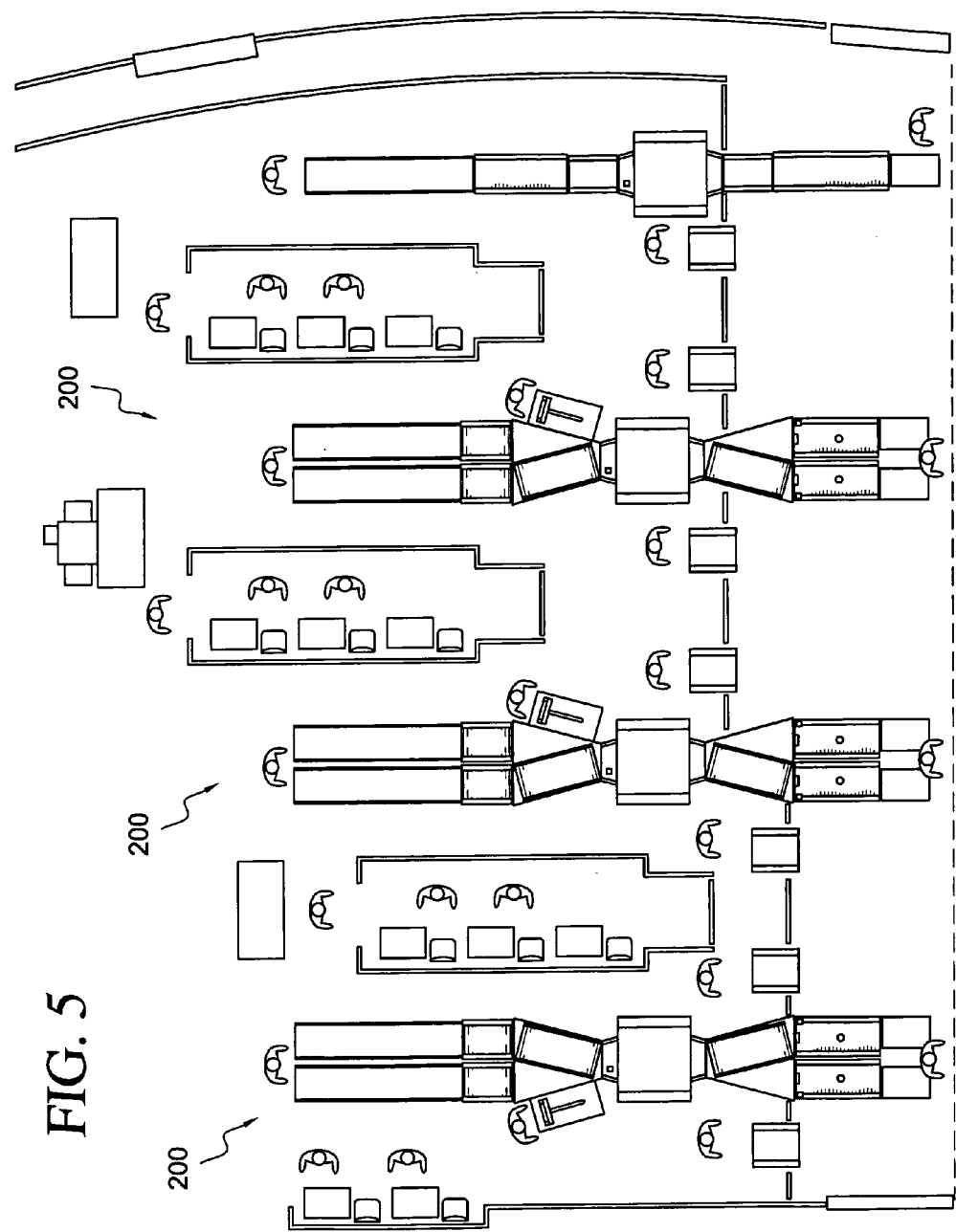
FIG. 5 shows a layout view of several material handling systems in accordance with the invention.

FIG. 5 shows a layout view of several material handlings systems in accordance with the invention. In view of the above discussion, it now becomes apparent that the following is possible:

A reduction in detection systems;
Increase in screening rates;
Increase in throughput;
Headcount reduction for personnel; and
An increased return on investment.

In one implementation, the system and method of the invention is modular and is easily adaptable to known systems. The system of the invention can be used with any type of detection system such as, for example, x-rays, controlled substance detection system, biometrics, and EWDS. In one implementation, the use of eight x-ray machines can be reduced to five or fewer EWDS machines. Also, it has been found that screening rates can increase by 15% or more and throughput can increase to about 330 items per hour, average. Headcount can be reduced, in one instance, from 182 to 139 with a return on total investment of about of 40%.

Control and Method of Use of the Invention

The control "C" of the invention controls many aspects of the handling system. This includes, for example, item or baggage tracking, which may be provided by a baggage tracking module. The baggage tracking module may be deployed under PC and PLC control using hardware and software architecture. The selected PLC may include an Ethernet or other type of interface for communications to a central computer for reporting and statistics.

In one implementation, the control system includes:
Power distribution and management including interlocking of Emergency Power Off circuits with the detection system. This function may also manage start-up and shut down sequences for the conveyors. In this implementation, upon detection of an suspect item, the control may trigger a shut down of the system, for example.
Input/Output interface communication with the conveyors, operators, and the detection system. This may be provided through the interface of the components of the system using a hardwiring, for example.
Control logic including tracking of baggage through the entire system, system mode control, fault determination and recovery, and identification of reject items.
Operator GUI for controlling normal operations, evaluating system status, and collecting/reporting operational statistics.

By way of example, the input conveyors 204a, 204b may be automatically controlled with photo sensors or other known detectors, or operators can be given small, hand-held devices for starting/stopping the input conveyors on demand. The hand-held devices would provide the operator dynamic control over the passenger load stations. This could be especially useful during peak operating times for the dual system, in this implementation. These devices could also be used to indicate that the next items being input belong to certain preferred passengers or passengers that are of high security risk. In this manner, the higher risk security passengers would have their items, in one implementation, automatically passed to the reject conveyor, which are subject to 100% hand search and processing.

The control logic can also track those items through the system and not allow an operator to clear the items. This may be accomplished using the sensors, which would trigger a lock in the system. This may be important if the operator is not located in the immediate area of the detection system. Bulk items for retail operations within the sterile area are also screened through the checkpoints. These items are large and heavy, so diverting them to the reject conveyor may result in an unacceptable ergonomic situation. Via the hand-held, the operator can signal the system that these items cannot be diverted to the suspect lane and must be manually stepped through the system. This ensures that suspect bulk good will not be released to the output lanes without an operator in attendance. Although this will reduce the throughput of the checkpoint lane these operations are typically not completed during high passenger load times. Additional weight sensors "W" may also be used to automatically divert larger items, if the item is over a predetermined weight limit.

In the system, baggage tracking requires singulation and identification of items as they enter the detection system. The control system will establish a unique tracking ID for each item that enters the detection system. This unique ID may be, for example, based on the size of the item or other criteria, as detected by the OCR, scanner, or other detection system. Through an encoder, for example, the system will track progress of the item through the detection system and onto the output divert conveyors, via the control. Through an interface with the control the baggage tracking control may receive status of each item processed (clear or suspect).

If an operator screening decision has not been received by the time an item reaches the transfer point for the output conveyor, it will be identified as "no response" and sent to the reject lane. This default assures that loss of communications or delayed responses do not result in suspect items being released for passenger pick-up. The system can be configured to default to a "stop" condition to allow the operator more viewing time during non-peak hours, or as required by the TSA.

The output PLC panel will indicate the current status of all items in the queue. Therefore, if items are cleared after the cut-off time for the transfer, the reject operator may remove those items and release them directly to the passenger. Items that require further investigation are removed for manual inspection.

Once an item is removed, the baggage tracking module will delete its unique ID, reconciling that rejected items were properly diverted and tracked through the baggage handling system. The baggage tracking module also provides a method for capturing the unique identification number of an item so that it could be used to select and display the correct X-ray image for that item at a separate manual inspection or ETD station. Storage, tracking, and transferring images for remote viewing is also possible.

While the invention has been described in terms of embodiments, those skilled in the art will recognize that the invention can be practiced with modification within the spirit and scope of the appended claims.

It is claimed:

1. A material handling system for carry-on luggage at a passenger security checkpoint, comprising:
    a plurality of input conveyors for conveying items of carry-on luggage, the input conveyors located at a passenger entrance to a security checkpoint;
    a merge device to singulate the flow of the items from the plurality of input conveyors into a single transportation path;
    a threat detection machine adapted to detect characteristics of the carry-on luggage while the carry-on luggage is located on the single transportation path;
    a plurality of output conveyors to provide buffer space for the items exiting from the single flow transportation path, the output conveyors located at a passenger exit to the security checkpoint; and
    an output diverting device positioned between an output of the single transportation path and the plurality of output conveyors to separate and direct the items to a respective one of the plurality of output conveyors.

2. The system of claim 1, wherein the plurality of input conveyors are at least two input conveyors and the plurality of output conveyors are at least a same number as the plurality of input conveyors.

3. The system of claim 1, wherein the output diverting device directs items originating from a first conveyor of the plurality of input conveyors to only a respective first conveyor of the plurality of output conveyors, and directs items originating from a second conveyor of the plurality of input conveyors to only a respective second conveyor of the plurality of output conveyors.

4. The system of claim 1, further comprising a take-away conveyor which transports empty bins from an output of the plurality of output conveyors to an input of the plurality of input conveyors.

5. The system of claim 4, further comprising a transport device for placing the empty bins on the take-away conveyor, the transport device including a chute or a lift.

6. The system of claim 1, further comprising a reject conveyor, wherein the output diverting device is moveable to direct rejected items to the reject conveyor.

7. A material handling system, comprising:
    a plurality of input conveyors for conveying items;
    a merge device to singulate the flow of the items from the plurality of input conveyors into a single transportation path;
    a plurality of output conveyors to provide buffer space for the items exiting from the single flow transportation path; and
    an output diverting device positioned between an output of the single transportation path and the plurality of output conveyors to separate and direct the items to a respective one of the plurality of output conveyors;
    wherein the merge device includes one of (i) a pivoting conveyor, (ii) a stationary Y-shaped merge alignable with each output of the plurality of input conveyors, (iii) a sweep arm and (iv) a belt guide; and
    the output diverting device is one of (i) a pivoting conveyor, (ii) a sweep rtm which is aligned with each input of the plurality of output conveyors, and (iii) a belt guide.

8. A material handling system, comprising:
    a plurality of input conveyors for conveying items;
    a merge device to singulate the flow of the items from the plurality of input conveyors into a single transportation path;
    a plurality of output conveyors to provide buffer space for the items exiting from the single flow transportation path; and
    an output diverting device positioned between an output of the single transportation path and the plurality of output conveyors to separate and direct the items to a respective one of the plurality of output conveyors;
    wherein the merge device directs movement of the items from one of the plurality of input conveyors to the single transportation path while blocking items on any remaining of the plurality of input conveyors; and
    the output diverting device diverts movement of the items exiting from the single transportation path to one of the plurality of output conveyors while blocking items from flowing to any remaining of the plurality of output conveyors.

9. The system of claim 1, further comprising at least one of:
    a detector to regulate the movement of the items between (i) each of the plurality of input conveyors and the merge device and (ii) the single transportation path and each of the plurality of output conveyors; and
    a scanning or reading device to capture information concerning the items such that the items are matched at the output of the single transportation path.

10. A material handling system, comprising:
    a plurality of input conveyors for conveying items;
    a merge device to singulate the flow of the items from the plurality of input conveyors into a single transportation path;
    a plurality of output conveyors to provide buffer space for the items exiting from the single flow transportation path; and
    an output diverting device positioned between an output of the single transportation path and the plurality of output conveyors to separate and direct the items to a respective one of the plurality of output conveyors;
    wherein the output diverting device is a vertical moving device to move rejected items to reject conveyor at different height than the plurality of output conveyors.

11. The system of claim 1, further comprising a control for controlling the diversion of the items passing by the merge device and the output diverting device.

12. The system of claim 11, wherein the control is a hand-held device.

13. A material handling device for carry-on luggage at a passenger security checkpoint, comprising:
    a plurality of input conveyors for conveying items of carry-on luggage, the input conveyors located at a passenger entrance to the security checkpoint;
    a singulator positioned in the transportation path of the items exiting from each of the plurality of input conveyors, and which directs the items into a single conveyor system leading to a detection system;

a detection system adapted to detect characteristics of the carry-on luggage while the carry-on luggage is located on the single conveyor system;

a plurality of buffer conveyors to provide buffer space for the items exiting from the detection system; and a diverting device positioned at an output of the single conveyor system to direct the items to one of the plurality of buffer conveyors, the buffer conveyors located at a passenger exit from the security checkpoint.

14. The system of claim 13, wherein the detection system includes any combination of an adjustable sensing biometrics device, an x-ray device, a controlled substance detecting device, and an explosive detection device.

15. A material handling system, comprising:

a plurality of input conveyors for conveying items;

a merge device to singulate the flow of the items from the plurality of input conveyors into a single transportation path;

a plurality of output conveyors to provide buffer space for the items exiting from the single flow transportation path; and an output diverting device positioned between an output of the single transportation path and the plurality of output conveyors to separate and direct the items to a respective one of the plurality of output conveyors;

wherein the singulator includes one of (i) a swivel conveyor, (ii) a stationary V-shaped merge, (iii) a sweep arm and (iv) a belt guide; and the diverting device is one of (i) a swivel conveyor, (ii) a sweep arm and (iii) a belt guide.

16. A material handling system, comprising:

a plurality of input conveyors for conveying items;

a merge device to singulate the flow of the items from the plurality of input conveyors into a single transportation path;

a plurality of output conveyors to provide buffer space for the items exiting from the single flow transportation path; and an output diverting device positioned between an output of the single transportation path and the plurality of output conveyors to separate and direct the items to a respective one of the plurality of output conveyors;

wherein the singulator directs the items from one of the plurality of input conveyors to the detection system while blocking the items on any remaining of the plurality of input conveyors; and the diverting device diverts the items exiting from the detection system to only one of the plurality of buffer conveyors while blocking the items from flowing to any remaining of the plurality of buffer conveyors.

17. The system of claim 13, further comprising:

a take-away conveyor which transports empty bins from an output of the plurality of buffer conveyors to an input of the plurality of input conveyors; and a reject conveyor, wherein the diverting device is moveable to direct rejected items to the reject conveyor.

18. The system of claim 13, further comprising a control to control: the singulator such that the items exiting from outputs of each of the plurality of input conveyors are directed to the detection system; and the diverting device such that the items exiting from the detection system are directed to a respective one of the plurality of buffer conveyors.

19. The system of claim 18, further comprising at least one detector to provide information to the control for regulating movement of the singulator and the diverting device as the items pass thereby.

20. The system of claim 18, wherein the control is a hand-held device.

21. A material handling device for carry-on luggage at a passenger security checkpoint, comprising:

at least two input conveyors for conveying items of carry-on luggage, the input conveyors located near a passenger entrance to the security checkpoint;

a metering device positionable between respective outputs of the at least two input conveyors and which directs the items into a single conveyor system leading to a detection system;

a detection system adapted to detect characteristics of the carry-on luggage while the carry-on luggage is located on the single conveyor system;

at least two pick-up conveyors located near a passenger exit from the security checkpoint;

a diverting device positionable between respective inputs of the at least two pick-up conveyors to direct the items exiting from the detection system to one of the at least two pick-up conveyors; and a control coordinating movement of the items through the metering device and the diverting device to regulate the transportation path of the items between the at least two input conveyors and the at least two pick-up conveyors.

22. The system of claim 21, wherein the detection system includes any combination of an adjustable sensing biometrics device, an x-ray device and an explosive detection device.

23. The system of claim 21, wherein the metering device is movable between outputs of the at least two input conveyors.

24. The system of claim 21, wherein the diverting device is movable between inputs of the at least two pick-up conveyors.

* * * * *